United States Patent [19]

McClintock et al.

[11] 4,304,264
[45] Dec. 8, 1981

[54] SOLENOID ACTUATED VALVE

[75] Inventors: Malcolm S. McClintock, Northport; Robert A. Wells, Huntington, both of N.Y.

[73] Assignee: Target Rock Corporation, Farmingdale, N.Y.

[21] Appl. No.: 160,466

[22] Filed: Jun. 18, 1980

[51] Int. Cl.³ .................... F16K 31/385; F16K 31/06
[52] U.S. Cl. .......................... 137/630.13; 137/630.15; 251/30
[58] Field of Search ..................... 251/30; 137/630.13, 137/630.15

[56] References Cited
U.S. PATENT DOCUMENTS

| Re. 25,338 | 2/1963 | Olson . | |
|---|---|---|---|
| 2,575,272 | 12/1951 | Harris . | |
| 2,693,825 | 11/1954 | Carr | 137/630.15 |
| 3,100,103 | 8/1963 | Bullard . | |
| 3,114,532 | 12/1963 | Gray et al. . | |
| 3,405,906 | 10/1968 | Keller | 251/30 |
| 3,737,141 | 6/1973 | Zeuner . | |

Primary Examiner—Arnold Rosenthal

[57] ABSTRACT

An improved solenoid operated valve utilizing a pilot valve nested within a main valve having a dual mode capability, fluid pressure assisted or solenoid powered, wherein the main valve's stem section is mounted within a tubular pilot armature and stem for movement toward the main armature to thereby open the pilot valve and then the main valve.

8 Claims, 2 Drawing Figures

SOLENOID ACTUATED VALVE

BACKGROUND OF THE INVENTION

This invention relates to valves and, more particularly, to solenoid motor actuated valves for liquid, gas or stream services, for temperatures to 1000° F. and for pressures to 10,000 psi or greater.

Still more specifically, the present invention has particular application to systems, including nuclear power generating systems, which require electrically operated valves which are highly reliable, rugged and fast-acting operation and which contain no packing or gaskets and have few moving parts to wear or malfunction. Furthermore, the present invention has special application to those systems which require a minimum of 200,000 valve open and close cycles without the need to repair or replace parts and where the valve will operate from zero differential pressure to 10,000 psi or more without the use of massive geared-motor operators or air actuators. The requirement that the valve operate at zero differential pressure, or where the pressure is insufficient to provide most of the operating force, is essential in those systems wherein testing of critical components on a regular basis is essential for their continued safe operation. Additionally, the present invention has special application to valves which must satisfy the aforedescribed requirements and which utilize a design which incorporates nested stem assemblies with slot and pin attachments which connect axially movable main and pilot armatures to their main and pilot discs.

Accordingly, it is an object of this invention to provide an improved solenoid actuated valve which utilizes the aforedescribed type of design and which safely utilizes relatively weaker stem and pin component parts employed therein.

It is a further object of the present invention to provide an improved valve of said aforementioned type of design wherein said stem and pin component parts, which are non-load bearing, are protected against damage.

It is another object of the present invention to provide an improved solenoid actuated valve of the type which utilizes a fixed core and a main armature which axially moves toward said core upon energization of said solenoid wherein jamming of said armature is obviated.

It is a still further object of this invention to provide an improved solenoid actuated valve wherein its operating response time is decreased, particularly during closure thereof.

Other objects of the invention will become apparent upon reading the specification taken in connection with the accompanying drawings.

SUMMARY OF THE INVENTION

Accordingly, the present invention contemplates a novel, normally closed valve with a valve body having a fluid inlet and a fluid outlet with a main valve seat, a main valve element, and a pilot valve chamber positioned between the inlet and outlet and also within the main valve element itself. A pilot valve seat and valve element connect the pilot chamber to the outlet while a restricted passage connects the inlet to the pilot chamber. The pilot valve has a capacity considerably greater than the restricted passage so that supply pressure entering the pilot chamber which holds the main valve closed can be bled from the pilot chamber thereby readily opening the main valve. Furthermore, supply pressure will open the main valve once the pilot chamber has been bled to the valve outlet.

A stem section of the main valve element is attached to a slidable main armature and a tubular stem section of the pilot valve element is attached to a slidable tubular pilot armature. The main valve element's stem section is mounted within the tubular pilot stem and armature for movement toward said main armature to thereby open the pilot valve. The pilot armature is also movable together with the main armature. Springs urge the pilot valve element into engagement with the pilot valve seat as well as urging the pilot armature away from the main armature. A solenoid coil is positioned in flux linking relationship with the armatures and magnetic structure adjacent to the coil. The magnetic structure provides a magnetic path with the armatures for the flux produced by the coil. The coil has sufficient power to complete a magnetic circuit through the armatures and magnetic structure to cause, during a first mode of operation, the pilot armature to move relative to the main armature to open the pilot valve. This action permits any fluid pressure existing in the pilot chamber to be bled to the outlet so that fluid pressure in the supply opens the main valve, thereby moving the main valve into a valve open position. Furthermore, such coil has sufficient power, to cause, during a second mode of operation, said pilot armature and pilot valve element to move toward said main armature, to open said pilot valve, and engage it in the open position and then to move both armatures concurrently to open said main valve, all in the absence of fluid pressure urging the pilot and main valves closed. The magnetic structure includes a fixed core spaced from said main armature, the main and pilot armatures being movable toward said fixed core when said main valve is moved to its open position by either mode of operation, fluid pressure or magnetic force, whereby said fixed core completes a flux path having characteristics such that said coil has sufficient power to hold the main armature and main valve element in the valve open position either in the presence or absence of fluid pressure.

In a narrower aspect of the invention, the valve body includes a tubular member having an open end which engages the main valve element when it is fully open thereby keeping open the magnetic air gap between the fixed core and the main armature and preventing damage to the non-lead bearing component parts. In another narrower aspect of the invention, the distance between opposed faces of the main and pilot armatures is smaller than an axial dimension of a pin and slot lost-motion connection between the pilot and main valve elements whereby the pilot stem is protected against engagement with the pin.

DETAILED DESCRIPTION OF THE DRAWINGS

Figure 1:
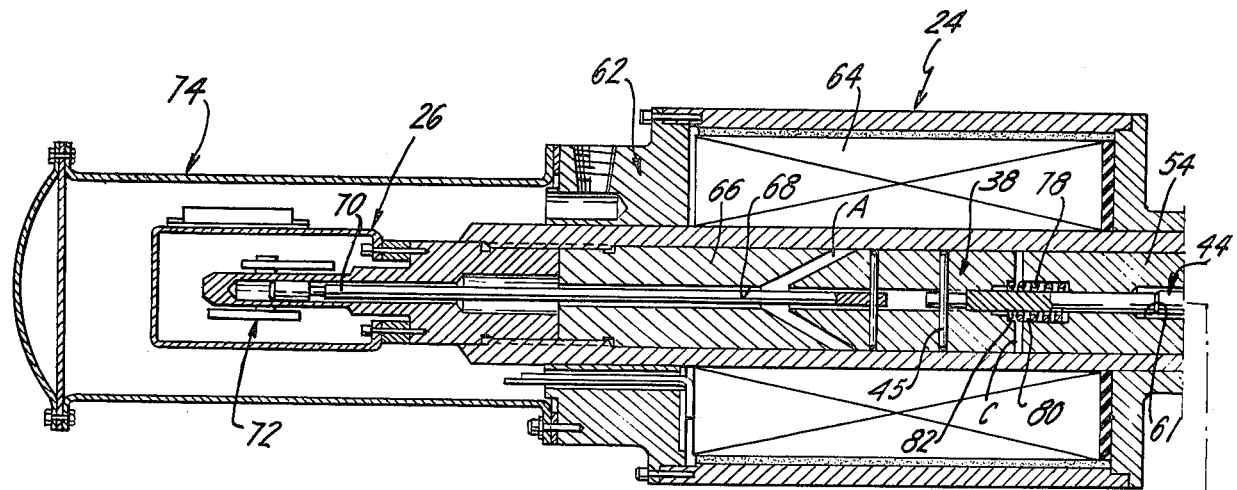
FIG. 1 is a cross sectional view of the valve construction of the invention with the main valve and the pilot valve in the normally closed position.
Figure 1:
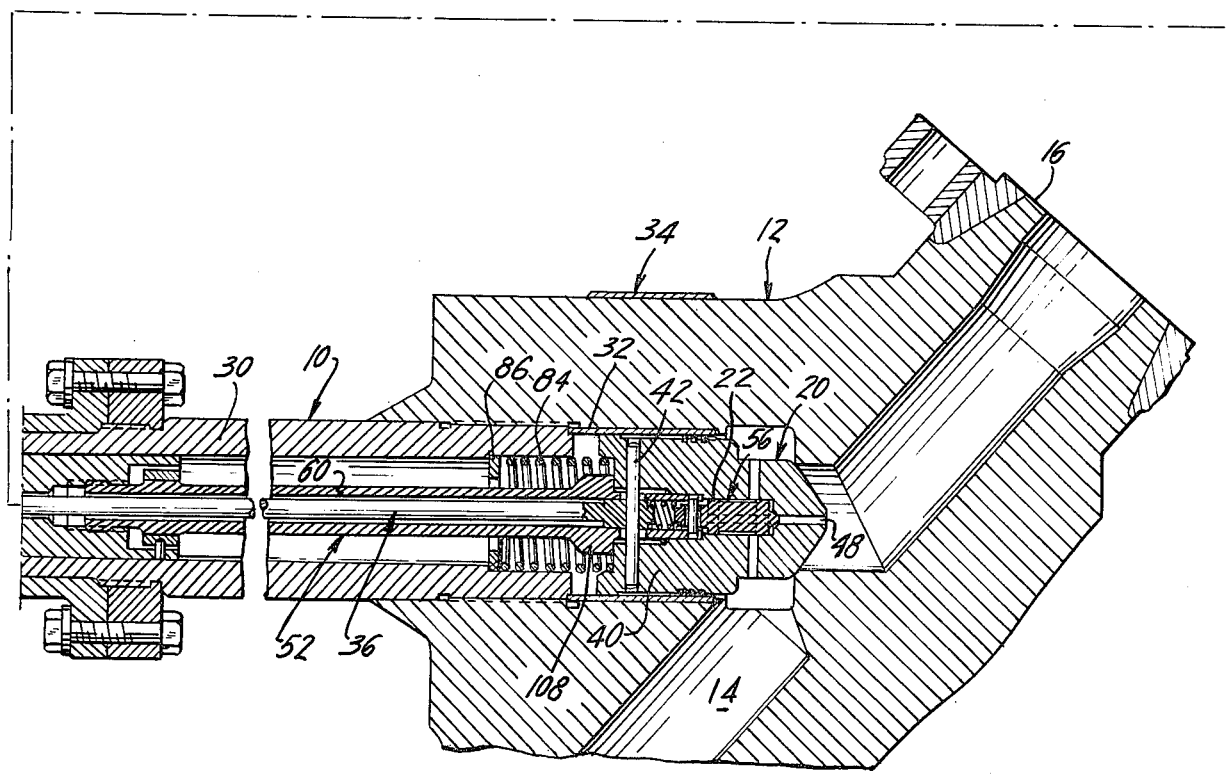
Figure 2:
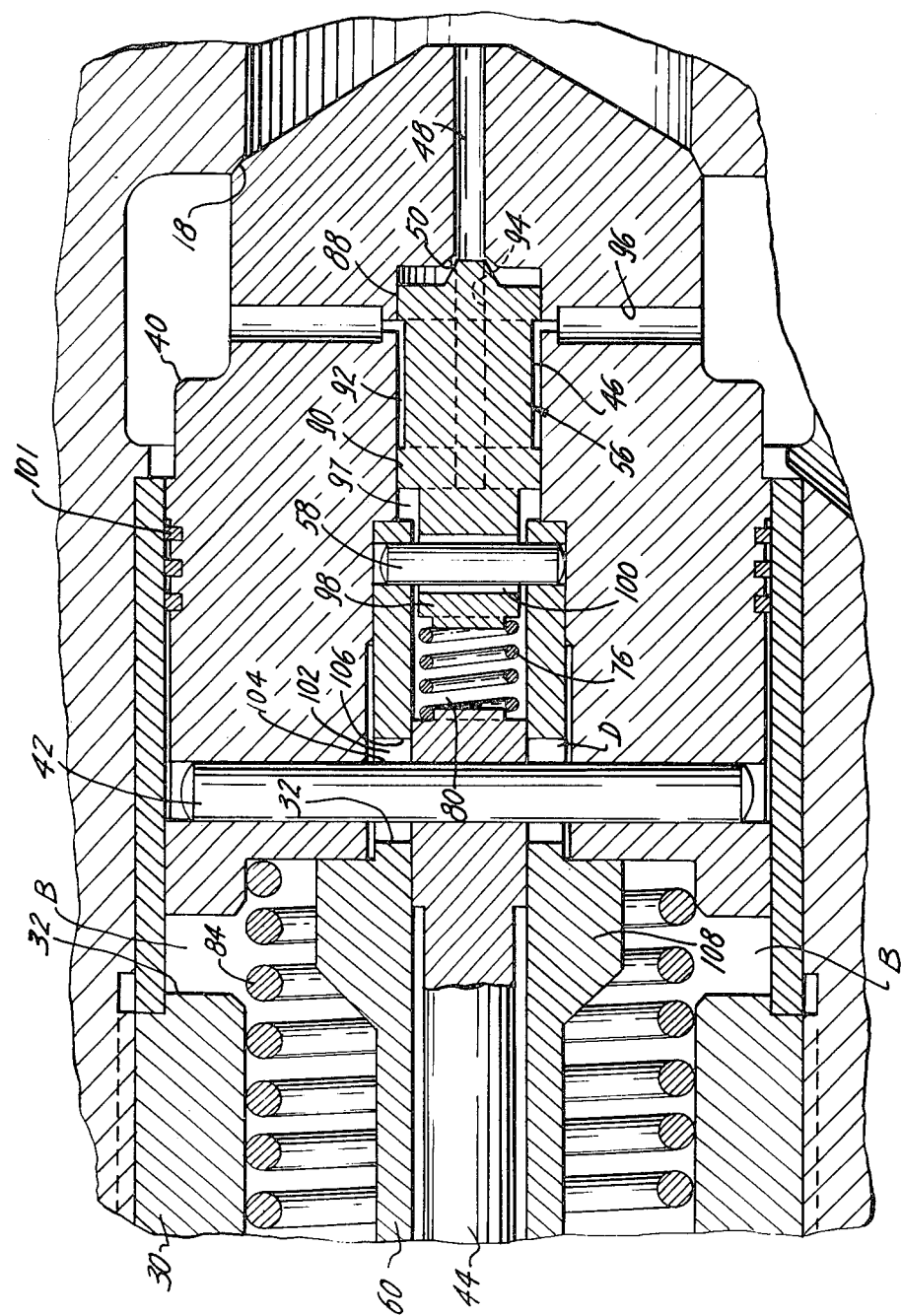
FIG. 2 is an enlarged fragmentary view of the structure of FIG. 1 showing both the main and pilot discs seated.

Now referring to the drawings FIGS. 1 and 2, there is shown a normally closed valve assembly 10 comprising a valve body 12 having a fluid inlet 14 and a fluid outlet 16 and a main valve seat 18. Positioned within the valve body 12 is a movable main valve assembly 20, a movable pilot valve assembly 22, an electromagnetic assembly or solenoid motor 24 for controlling the operation, or actuation, of said valves 20 and 22, and an indicator assembly 26. The valve body 12 further includes a bonnet assembly 28 generally comprising an elongated, non-magnetic, tubular member 30, positioned at its "open end" 32, within a generally cylindrical portion 34 of the valve body, which portion 34 angularly extends outwardly from main valve seat 18. Positioned within tubular member 30 are substantially coaxially aligned movable main and pilot valve assemblies 20 and 22, respectively, which control the flow of fluid between the inlet 14 and outlet 16 in cooperation with the main valve seat 18.

The main valve assembly 20 comprises a main valve element 36 attached at its outer end to a main armature 38, which is controlled by said electromagnetic assembly 24. The main valve element 36 includes a generally cylindrical main disc 40 rigidly connected by a transversely extending pin 42 to the inner end of a solid, elongated, axially aligned, cylindrical stem section 44, the outer end of stem section 44 being threadedly attached to the main armature 38 and locked in position by a transversely extending pin 45.

Within the main valve disc 40, there is formed a cylindrically shaped pilot valve chamber 46 which is in limited fluid communication with the inlet 14 through open, restricted passages (described infra) extending radially through the main valve disc 40. A passageway 48 axially formed in the end of the main valve disc 40 connects the pilot valve chamber 46 to the outlet 16 and the inner end of said passageway 48 forms a pilot valve seat 50. The pilot valve assembly 22 comprises a pilot valve element 52 threadedly attached at its outer end to the inner end of a pilot armature 54, which is also controlled by the electromagnetic assembly 24. The pilot valve element 52 includes a generally cylindrical, elongated pilot disc 56 loosely connected by a transversely extending pin 58 to the inner end of an axially aligned elongated tubular stem section 60, the outer end of which is attached to the inner end of pilot armature 54, which armature has an axially extending central opening 61 through which the main valve's stem 44 extends through; this main stem 44 also is mounted within tubular pilot stem 60 and extends through its complete length.

The two valve assemblies 20 and 22 are controlled by and integrated with the solenoid or electromagnetic structure 24 positioned within and around bonnet assembly 28 adjacent the pilot and main armature, 54 and 38, respectively. This electromagnetic structure 24 includes a generally cylindrical housing 62 made of a magnetic material having a coil 64 contained therein and "wound" around a portion of the non-magnetic tubular member 30, all of which are positioned around the outside of the bonnet assembly 28. Positioned within and affixed to bonnet assembly 28, near its outer end, is a generally cylindrical member or fixed core 66 made of magnetic material having an axially extending opening 68 therethrough.

The indicator assembly 26, is conventional and is positioned at its inner end within the outer end of bonnet assembly 28 and extends outwardly therefrom and seals the outer end of the bonnet assembly 28. This indicator assembly 26 is made of non-magnetic material and includes a rod-like element 70 which extends through the fixed core's opening 68 and is directly attached, at its inner end, to the outer end of main armature 38; the outer end of rod 70 contains, near its tip, a small magnet (not shown) which conventionally operates an associated conventional reed-switch 72 positioned adjacent thereto. A cover assembly generally indicated as 74 encloses said indicator assembly 26 and further seals the end of bonnet assembly 28.

A spring means, including a first spring 76, is positioned axially within the tubular pilot stem 60, at its inner end, between the outer end of pilot disc 56 and the inner end of main stem 44, to urge said pilot disc 56 towards its seat 50. This spring means also includes a second spring 78 generally positioned within a recess 80 in the outer end of pilot armature 54 and within another recess 82 in the inner end of main armature 38, to urge said pilot armature 54 inwardly thereby also urging said pilot disc 56 against its seat 50. A main spring 84 of relatively large size, is positioned between main disc 40 and a spring retainer 86 abutting a shoulder formed in the inside of the tubular member 30 of bonnet assembly 28, and engages the outer, back, portion of main disc 40, urging it against its seat 18.

In the valve's normally closed position, the distance between the opposed faces of said main armature 38 and said fixed core 66, a first predetermined distance "A", is greater than the distance between the open end 32 of said tubular member 30 and the opposed outer, back, portion of main disc 40, a second predetermined distance "B". Furthermore, the opposed faces of said main and pilot armatures, 38 and 54, respectively, are normally spaced apart, the distance between them being a third predetermined distance "C".

Referring now specifically to FIG. 2, the pilot disc 56 is slidably mounted within pilot chamber 46 formed within main valve disc 40, and includes front and rear shoulder portions 88 and 90, respectively, which engage the inner walls of said pilot chamber 46 and which form therebetween an annular space 92, a pair of symetrically arranged axially extending slots or side passages 94 (only one of which is shown in dotted lines) formed along its periphery. Restricted passages 96, which extend radially through the main valve disc 40, provide limited fluid communication with the inlet 14. The pilot chamber 46 is also in open fluid communication through side passages 94, with the backside of main valve disc 40.

The forward or inner end of the pilot stem 60 is slidably positioned within a cylindrical outer chamber 97, formed in the outer end of main disc 40, as well as loosely over a narrower slotted end or back portion 98 of the pilot disc 56; the pilot stem 60 is attached to the slotted back portion 98 of the pilot disc 56 by a cylindrical connecting pin 58 which extends transversely through a slot 100 formed in said narrow portion 98 and which is substantially greater in diameter than the pin's diameter. The ends of connecting pin 58 press fit in an opening in the pilot stem 60, near its very end.

The main disc 40, which is slidably mounted within valve body 12, carries a suitable seal 101, preferably a piston ring, for preventing fluid flow to the pilot chamber 46 from the inlet 14 except through restricted passages 96. The main disc 40 is attached to its main stem 44 by its connecting pin 42 which extends transversely through axially extending slots 102 formed in the tubular pilot stem 60 near its inner end, which slots 102 are positioned on opposite sides of the inner end of the main valve stem 44. These slots 102 permit the pilot valve 52 to move with the pilot armature 54 and to permit relative movement thereof with respect to the main valve assembly 22; that is the pilot valve assembly 22 is permitted to move independently of the main valve assembly 20. In the valve's normally closed position, the distance between opposed lower or inner portions or faces 104 and 106 of said main connecting pin 42 and slot 102, respectively, a fourth predetermined distance "D", is greater than the distance between the opposed faces of said pilot and main armatures, 54 and 38, respectively, the third predetermined distance "C". This distance differential protects the pilot stem 60. Outwardly positioned from the upper end of slots 102, a coaxial shoulder 108 is formed on pilot disc stem 60 and normally its front surface engages the opposed backside portion of main disc 40; it provides a cushioning effect and functions to protect the tip of the pilot disc 56 and its seat 50.

As shown in FIGS. 1 and 2, when the coil 64 is de-energized, the valve 10 is in its normally closed position with the main valve assembly 20 and pilot valve assembly 22 closed as urged by their springs 84, 76 and 78, respectively. Additionally, fluid inlet or supply pressure entering pilot chamber 46 through restricted passages 96, located in main disc 40, is transmitted through the two side passages 94, located in pilot disc 56, to the backside of the main disc 40. As a result, any fluid inlet pressure against the backside of the main disc 40 holds the main valve assembly 20 in its normally closed position when the pilot valve assembly 22 is closed. In a similar manner, such inlet pressure holds the pilot valve assembly 22 in its normally closed position. This method of maintaining the main and pilot valve assemblies 20 and 22, respectively, closed, which action is due to "differential pressure", is conventional and is described in the Keller U.S. Pat. No. 3,405,906. Suffice to say, the pressure in the pilot chamber 46 and outer chamber 97 will be equal to the inlet supply pressure. Since the area of backside of the main valve disc 40 exposed to the outer chamber pressure, the first surface area, is larger than the annular area of the front of the main disc 40 exposed to the inlet supply pressure, the second surface area, a resulting pressure force exists at the backside of the main disc 40 tending to keep the main valve disc 40 positively closed against its seat 18. The differential pressure at the backside of the main disc 40 compared to that pressure existing at the underside of the main disc 40 at the valve's outlet, acts to keep the pilot valve disc 56 closed against its seat 50 in the main disc 40. The force exerted by this differential pressure acting on the pilot disc 56 plus its springs 76 and 78 and the weight of the moving parts of the pilot valve assembly 22 must be overcome by the solenoid force to open this pilot valve disc 56.

To operate the valve against fluid supply pressure urging the pilot and main valve discs, 56 and 40, respectively, closed, that is during a first mode of operation, coil 64 is energized by a suitable source of electric power (not shown) conventionally connected to said coil 64. Energization of this coil 64 induces magnetic flux lines through the electromagnetic assembly 24 through the housing member 62, the fixed core 66, main armature 38 and pilot armature 54. The power provided by coil 64 is more than sufficient to induce an axial force adequate to close magnetic gap C between the pilot armature 54 and the main armature 38, both of which are slidably mounted within tubular member 30, thus moving the pilot armature 54 into engagement with the main armature 38 as well as moving outwardly the connected pilot valve element 52 against inlet pressure and its springs 76 and 78. The slots 102 in the pilot stem 60 permit the movement of the pilot valve assembly 22 independent of the main valve assembly 20. Although the power provided by the coil 64 is sufficient to induce an axial force adequate to decrease magnetic gap A, the gap between opposed faces of the fixed core 66 and the now joined main and pilot armature, 38 and 54, respectively, to thereby move the main valve assembly 20 to its fully open position against inlet pressure, the main valve disc 40 is fully opened by a "pressure assist" action in this mode.

Movement of the pilot armature 54 connected to the pilot disc 56 through its stem 60 causes pilot disc 56 to lift and uncover the pilot seat 50 in the main disc 40. Such opening of the pilot disc 40 bleeds the pressure from pilot chamber 46 since the pilot valve disc 56 passageway 48 has a flow capacity several times greater than the restricted inlet passage 96. Therefore, the pressure in the pilot chamber 46 decreases and approaches the level of the outlet or downstream pressure. When the force of the supply pressure acting on the annular area of the main valve disc 40 exposed to supply pressure, exceeds the force of the pilot chamber 46 pressure acting on the backside of the main disc 40 plus the main valve spring 84 and the total weight of the other movable parts of the main valve assembly 20, the main valve assembly 20 will move in a direction to open the main valve disc 40 until it is limit-stopped, that is until the peripheral portions at the back part of the main disc 40 contacts or engages the open end or base 32 of the tubular member 30 of the bonnet assembly 28, thereby fully closing non-magnetic gap B but only partially closing magnetic air gap A.

It should be noted that the non-load bearing components of the main and pilot valve assemblies, 20, 22, respectively, main stem 44 and pins 42 and 45, and pilot stem 60 and pin 58, are protected against damage during operation of the valve by virtue of the particular dimensional relationship of gaps A and B, and C and D. This is because the outer end of main armature 38 is prevented from impacting, as well as jamming, against the inner conforming end of fixed core 66, since the base 32 of the tubular member 30 limits the main armature's outward axial movement. Furthermore, the valve's operating response time is improved, particularly during closure thereof, because magnetic air gap A is not permitted to fully close. Similarly, main pin 42 and pilot stem 60 are protected against damage, since the magnetic air gap C is made smaller than gap D, so that when the pilot valve assembly 22 is opened, the lower portion 106 of slot 102 of pilot stem 60 does not strike or engage the inner portion of main pin 42, as the smaller gap C is closed first.

With such arrangement, changes in pressure across the valve do not affect the position of the main disc 40. Upon de-energization of the coil 64, the pilot valve armature 54 and pilot disc 56 are urged into the closed position by the two pilot springs 76 and 78, with the result that fluid supply pressure is once more allowed to accumulate in the pilot valve chamber 46 and outer chamber 97 and acts against the rear of the main disc 40, together with main spring 84, to urge the main disc 40 closed. Re-stated, when the pressure in the pilot and outer chambers, 46 and 97, respectively, increases to the level of the supply pressure, the main disc 40 will close, due to the "differential area".

To operate the valve in the closed position when no differential pressure exists, such as when the supply pressure is zero (or very low) or when there is equal pressure on both sides of the main valve disc, that is, during a second mode of operation, coil 64 is energized as before, but in this mode there will be no pressure assist to open the valve. Accordingly, the valve will operate as in a conventional solenoid valve as the power provided by coil 64 is made sufficient for this purpose; pilot armature 54 will be attracted to the main armature 38 closing magnetic air gap C and this two element unit will be attracted toward fixed core 66 thereby lifting the pilot disc 56 away from its seat 50 and then the main disc 40 away from its seat 18, whereby the valve is moved into its fully open position unaided by any pressure assist until its motion is limit-stopped by the end 32 of the tubular member 30.

It should be understood that this invention is not limited to the specific details of construction and arrangement thereof herein illustrated and that changes and modifications may occur to one skilled in the art without departing from the spirit and scope of the invention.

What is claimed is:

1. In a valve having a valve body with a fluid inlet, a fluid outlet, a main valve seat, a pilot valve chamber, a main valve element seatable on said main valve seat, means forming a pilot valve seat connecting said pilot chamber to said outlet, a pilot valve element seatable on said pilot valve seat, means defining a restricted passage connecting said inlet to said pilot valve chamber, said passage having smaller flow capacity than said pilot valve seat, said main valve element having a first surface area in open communication with said pilot valve chamber so that said main valve is held by fluid pressure in its closed position when the pilot valve element is closed, said main valve element having a second surface area smaller than said first surface area exposed to said inlet pressure when said main valve element is moved by inlet pressure away from said main valve seat when said pilot valve element is opened, said pilot valve element being urged against its seat by pressure in said pilot valve chamber, and electromagnetic means for controlling the operation of said valve comprising:

a main armature attached to said main valve element, being movable with said main valve element between valve open and valve closed positions;
   said main valve element including a stem section connected at one end to said main armature;
   a pilot armature attached to said pilot valve element and mounted for movement towards said main armature to open said pilot valve and being movable with said main armature;
   spring means urging said pilot valve element into engagement with said pilot valve seat and urging said pilot armature away from said main armature;
   coil means positioned in flux linking relation with said armatures;
   magnetic structure positioned adjacent said coil means and said armatures for providing a magnetic path for flux produced by said coil means, said coil means having sufficient power to complete a flux path through said armatures and to generate sufficient magnetic force to cause, during a first mode of operation, said pilot armature and said pilot valve element to move towards said main armature against fluid pressure urging the pilot valve closed to open said pilot valve element and bleed pressure from said pilot chamber, whereby fluid pressure existing in said inlet opens said main valve element and thus moves said main valve element into said valve open position, and to cause, during a second mode of operation, said pilot armature and said pilot valve element to move toward said main armature to open said pilot valve element whereby the pilot armature moves into engagement with said main armature, and then to move said pilot and main armatures together to open said main valve, all in the absence of fluid pressure urging the pilot valve closed;
   said magnetic structure including a fixed core portion spaced from said main armature when the main armature is in said valve closed position, said main armature and pilot armature being movable closer to said fixed core portion when said main valve is moved to its open position by either fluid pressure or magnetic force, in the first and second modes, respectively, whereby said fixed core portion completes a flux path having characteristics such that said coil means has sufficient power to hold said main armature and main valve element in said valve open position both in the presence and absence of said fluid pressure;
   said pilot chamber and said pilot valve seat being formed within the interior of said main valve element;
   said pilot valve element including a tubular stem section connected at one end to said pilot armature;
   said pilot armature having a tubular shape; and said main valve element's stem section being mounted within said pilot armature and said tubular stem section of said pilot valve element.

2. The valve of claim 1, wherein said tubular section of said pilot valve element being formed with an axially extending slot on opposite sides of said main valve element, and a pin extending through said main valve element and said tubular section of said pilot valve element and said slots whereby said pilot valve element is movable with said pilot armature and said slots permit relative movement of the pilot valve element and the pilot armature with respect to the main valve element and the main armature.

3. The valve as in claim 1, wherein said valve body includes a tubular member, within which said armatures move, having an open end which engages said main valve element when said main valve element is fully open whereby the magnetic air gap between said fixed core and said main armature remains open.

4. The valve as in claim 3, in which there is provided a predetermined first and second distance between said opposed faces of said main armature and said fixed core portion and the open end of said tubular member and said main valve element, respectively, when said main valve element is fully closed, said first predetermined distance being greater than said second predetermined distance.

5. The valve of claim 2, in which there is provided a predetermined third and fourth distance between opposed faces of said main and pilot armatures and opposed lower portions of said pin and slot, respectively when said pilot valve is seated on said pilot valve seat, said third predetermined distance being smaller than said fourth predetermined distance whereby the pilot stem is protected from engagement against said pin during movement of said pilot valve element relative to said main valve element.

6. The valve of claim 1, wherein said pilot valve element includes a pilot disc section, and wherein said spring means includes a spring positioned between one end of said main valve's stem and one end of said pilot disc section of said pilot valve element.

7. The valve of claim 1, wherein said spring means includes a spring positioned between said pilot and main armatures.

8. The valve of claim 1, wherein said main valve stem is solid.

* * * * *